United States Patent
Furnary et al.

(10) Patent No.: US 10,112,868 B2
(45) Date of Patent: Oct. 30, 2018

(54) METHOD FOR POST-CONSUMER WASTE SEGREGATION, COMMINUTION, AND CREATION OF CEMENTITIOUS AGGREGATE MATERIAL

(71) Applicants: Kevin Furnary, Vienna, VA (US); Earl T. Balkum, Ararat, NC (US)

(72) Inventors: Kevin Furnary, Vienna, VA (US); Earl T. Balkum, Ararat, NC (US)

( * ) Notice: Subject to any disclaimer, the term of this patent is extended or adjusted under 35 U.S.C. 154(b) by 132 days.

(21) Appl. No.: 15/443,819

(22) Filed: Feb. 27, 2017

(65) Prior Publication Data

US 2018/0244574 A1    Aug. 30, 2018

(51) Int. Cl.
| | |
|---|---|
| *C08G 63/02* | (2006.01) |
| *C04B 18/20* | (2006.01) |
| *C04B 14/04* | (2006.01) |
| *C08J 11/06* | (2006.01) |
| *B09B 3/00* | (2006.01) |
| *B03C 1/23* | (2006.01) |

(52) U.S. Cl.
CPC ............. *C04B 18/20* (2013.01); *B03C 1/23* (2013.01); *B09B 3/0041* (2013.01); *C04B 14/04* (2013.01); *C08J 11/06* (2013.01); *B03C 2201/20* (2013.01); *C08J 2300/00* (2013.01)

(58) Field of Classification Search
USPC .................................................. 521/40, 40.5
See application file for complete search history.

(56) References Cited

U.S. PATENT DOCUMENTS

2014/0329280 A1\* 11/2014 Medoff .................. B01J 19/085
435/72

\* cited by examiner

*Primary Examiner* — Terressa Boykin
(74) *Attorney, Agent, or Firm* — Williams Intellectual Property; Benjamin F. Williams

(57) ABSTRACT

A method for post-consumer waste segregation, comminution, and creation of a cementitious aggregate, that enables more complete reclamation of zorba from a processing stream segregable from plastic waste. The plastic waste is simultaneously impregnated with silica to create a cementitious aggregate employable with load bearing utility as a substitute for traditional concrete aggregates.

3 Claims, 2 Drawing Sheets

METHOD FOR POST-CONSUMER WASTE SEGREGATION, COMMINUTION, AND CREATION OF CEMENTITIOUS AGGREGATE MATERIAL

BACKGROUND OF THE INVENTION

Various types of processing streams for segregating waste into discrete factions are known in the prior art. However, what is needed is a method for post-consumer waste segregation, comminution, and creation of a cementitious aggregate material that enables more complete recovery of zorba from commingled metallic and non-metallic waste while enabling creation of a cementitious aggregate having utility as a substitute for traditional concrete aggregates used in load bearing construction.

The present method for post-consumer waste segregation, comminution, and creation of a cementitious aggregate includes addition of silica to a processing stream of comminuted, commingled waste, whereby action of heat effects mechanical bonding of silica particles to the surface of plastic waste particles to create a cementitious aggregate as set forth in U.S. Pat. No. 6,488,766, which reference is included in its entirety herein by reference. This cementitious aggregate enables use of post-consumer plastics for construction and other purposes as a substitute to traditional concrete aggregates.

Addition of silica to the processing stream further enables increased efficiency in separation of zorba from plastic waste. Zorba is deflectable by action of eddy currents and a moving magnetic field applied to the processing stream. In the present state of the art, however, where addition of silica to the processing stream is not employed, plastic waste particles are seen to deflect alongside zorba, due to static cling and/or other electric interaction with conductors, whereby complete separation of zorba from plastic waste is currently impossible. However, once silica has been bonded to plastic waste particles, insulation of the plastic waste particles prevents the plastic waste particles from statically interacting with zorba particles, whereby complete separation and reclamation of zorba from plastic waste is enabled for resale.

Presently, post-consumer waste arrives for processing as commingled partially processed post-consumer waste. Such waste generally comprises 97% plastic, less than 1% ferrous waste, and approximately 2% zorba consisting mainly of beverage can aluminum ("BCA"). BCA is quite valuable, and the inability of present segregation methods to efficiently segregate BCA (and other zorba) from plastic waste which "rides along" represents a significant loss of potential value.

The present method, therefore, enables more complete recovery of zorba from plastic waste during creation of a lightweight cementitious aggregate subsequently usable as a load bearing substitute to traditional concrete aggregates. Plastics that are typically not recycled (such as those plastics identified by the number 3, i.e. poly vinyl chloride ("PVC"), for example, or the number 4, i.e. low density polyethylene, or number 7 plastics, i.e. poly carbonate ("PC") and bisphenol A ("BPA") are frequently interned in landfills or left elsewhere in the environment where they can cause contamination and pose health risks. The present method not only enables more efficient and profitable recovery of recyclable metallic waste for resale, said present method further enables simultaneous creation of a lightweight, load bearing construction material whereby non-recycled and disused plastics are transformable to enable further utility.

FIELD OF THE INVENTION

The present invention relates to a method for post-consumer waste segregation, comminution, and creation of a cementitious aggregate, and more particularly, to a method for post-consumer waste segregation, comminution, and creation of a cementitious aggregate that enables more complete reclamation of zorba from a processing stream separated from plastic waste while impregnating said plastic waste with silica to create a cementitious aggregate wherein plastic waste may be employed with load bearing utility as a substitute for traditional concrete aggregates.

SUMMARY OF THE INVENTION

The present method for post-consumer waste segregation, comminution, and creation of a cementitious aggregate has been devised to enable creation of a lightweight cementitious aggregate usable as a substitute for traditional concrete aggregates while segregating metallic waste from non-metallic waste.

Presently much post-consumer plastic waste ends up as part of a waste stream ultimately interned in landfills or left to contaminate the environment. The present method for post-consumer waste segregation, comminution, and creation of a cementitious aggregate enables utility of plastic waste by transforming said plastic waste into a usable commodity. At the same time, addition of silica to bond to the surface of plastic waste particles simultaneously enables more complete and efficient recovery of zorba from commingled post-consumer waste whereby efficiency of reclamation of valuable non-magnetic, metallic waste is significantly increased.

The present method for post-consumer waste segregation, comminution, and creation of a cementitious aggregate, therefore, includes routing partially processed post-consumer waste into a processing stream for sorting and segregation of metallic waste and plastic waste. Partially processed post-consumer waste, as used herein throughout, is taken to include commingled post-consumer waste comprising approximately 97% plastic waste, less than 1% ferrous waste, and approximately 2% zorba. Plastic waste is non-metallic waste and includes all manufactured organic compounds found in post-consumer waste, including for example polypropylene ("PP" identifiable by the number "5" stamped within the so-called "chasing arrows" recycling symbol), poly vinyl chloride ("PVC", identifiable by the number "3" stamped within the "chasing arrows"), high density polyethylene ("HDPE", identifiable by the number "2" within the "chasing arrows"), low density polyethylene ("LDPE", identifiable by the number "4" within the "chasing arrows"), polyethylene terephthalate ("PET", identifiable by the number "1" within the "chasing arrows"), polystyrene ("PS", identifiable by the number "6" within the "chasing arrows"), among other recyclable plastics (s.a. "poly carbonate", "BPA" and "ABS", identifiable by the number "7" within the "chasing arrows") found in post-consumer waste streams worldwide. Zorba is all non-magnetic metallic waste including, for example, beverage can aluminum ("BCA") among other non-magnetic metallic waste deflectable via action of eddy current induction.

Partially processed post-consumer waste enters the processing stream and is shredded to a reduced size. Ferrous waste; that is, magnetic metallic waste; is typically more easily removed and segregated from the processing stream than non-magnetic metallic waste. As seen in the art, ferrous waste is segregated from the processing stream by action of magnetic force applied to attract ferrous waste particles away from the processing stream. Action of the magnetic force may be controllable by an electromagnet devised to attract ferrous waste particles and maintain them in a position that is deflected from the processing stream. Ferrous waste particles may then be released by cessation of the magnetic force and collected separate from the processing stream. Ferrous waste is thence reclaimable for recycling.

The processing stream, now absent ferrous waste, is comminuted to uniform, standardized particle size of around $\frac{3}{8}^{th}$ of an inch (0.9525 cm). Uniform bulk density is thereby attained throughout the commingled, post-consumer waste in the processing stream. The processing stream is then subject to addition of silica which, by action of heat, effects surface bonding to plastic waste particles. Heat may be applied to the silica previous to introduction into the processing stream, whereby heated silica particles effect binding directly to plastic waste particles by conduction of heat thereto. Alternatively, heat may be applied to the processing stream previous to addition of silica, whereby the enthalpy of fusion of plastic waste particles is increased and unheated silica thence binds to the surface of softened plastic waste particles. A third alternative applies heat directly to the processing stream after silica has been added thereto, whereby both plastic waste and silica is heated and mechanical bonding of silica to the plastic waste particles is effective due to increased enthalpy of fusion of the plastic waste particles. In the example embodiment disclosed herein, heat is applied between a range of 120° C. and 480° C. for a duration of between 2 and 30 seconds.

Binding of silica to plastic waste particles effects two significant changes to the processing stream. Firstly, bulk density of plastic waste particles is increased relative other, non-plastic waste. The increased bulk density of plastic waste particles relative other, non-plastic waste particles enables more efficient deflection of zorba when eddy currents are applied to force separation of zorba out of the processing stream, as will be described subsequently.

Secondly, the insulating properties of silica obviate static cling of plastic waste particles to zorba particles during eddy current induction and thereby prevent inadvertent deflection of plastic waste particles alongside zorba, as is problematic in the present state of the art. Thus efficiency of zorba reclamation from the processing stream is increased and nearly 100% zorba is segregable without contamination of plastic waste particles.

The processing stream is then cooled by action of forced air to expedite convection of heat from the waste particles. Deflecting zorba by action of eddy currents applied to the processing stream enables almost 100% recovery of zorba removed completely from plastic waste and other non-metallic waste. Zorba is now routable for reclamation, resale, and recycling.

Plastic waste and any other non-metallic waste remaining in the processing stream are now collectable segregated from more valuable metallic waste. Plastic waste is also prepared for use as a cementing agent—a cementitious aggregate usable as a substitute for traditional concrete aggregates. Silica bonded to the plastic waste particles enables stronger mechanical bonding of plastic particles when cemented and formed. The cementitious aggregate is thus directable for construction uses wherein a lightweight substitute for traditional concrete aggregates is desirable.

Thus post-consumer waste is transformable from a waste stream for reclamation of ferrous and non-ferrous metallic waste for subsequent resale, and plastic waste containing recyclable plastics, as well as plastics not readily recyclable in the industry (such as PVC, LDPE, PP, PS, ABS, BPA, and poly carbonate, in addition to PET and HDPE, for example), are reclaimed from landfills and rendered as a product having utility and therefore also rendered appropriate for resale.

Thus has been broadly outlined the more important features of the present method for post-consumer waste segregation, comminution, and creation of a cementitious aggregate material so that the detailed description thereof that follows may be better understood and in order that the present contribution to the art may be better appreciated.

Objects of the present method for post-consumer waste segregation, comminution, and creation of a cementitious aggregate material, along with various novel features that characterize the invention are particularly pointed out in the claims forming a part of this disclosure. For better understanding of the method for post-consumer waste segregation, comminution, and creation of a cementitious aggregate material, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
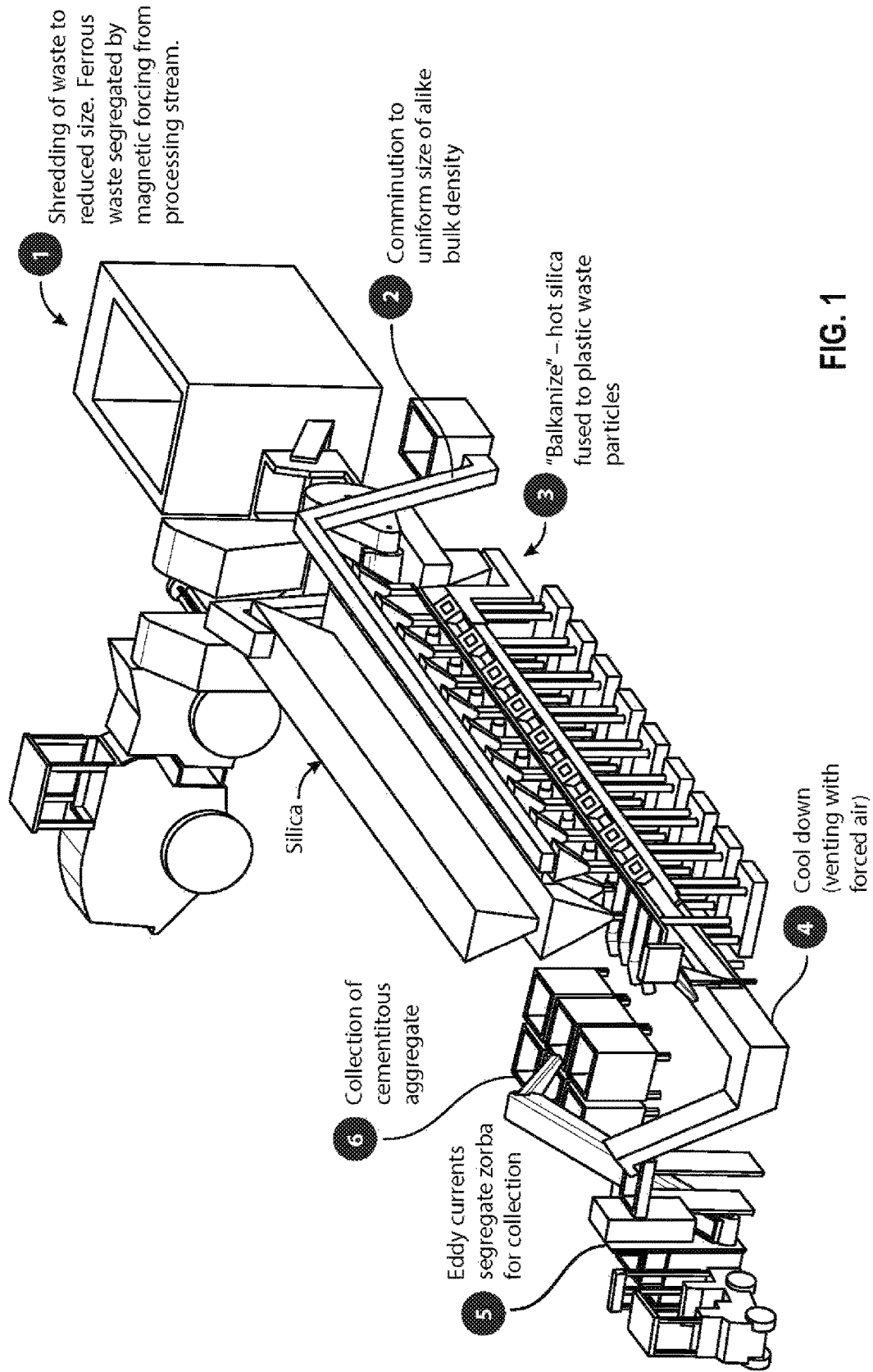
FIG. 1 is a diagrammatic view of an example embodiment of the present method.
Figure 2:
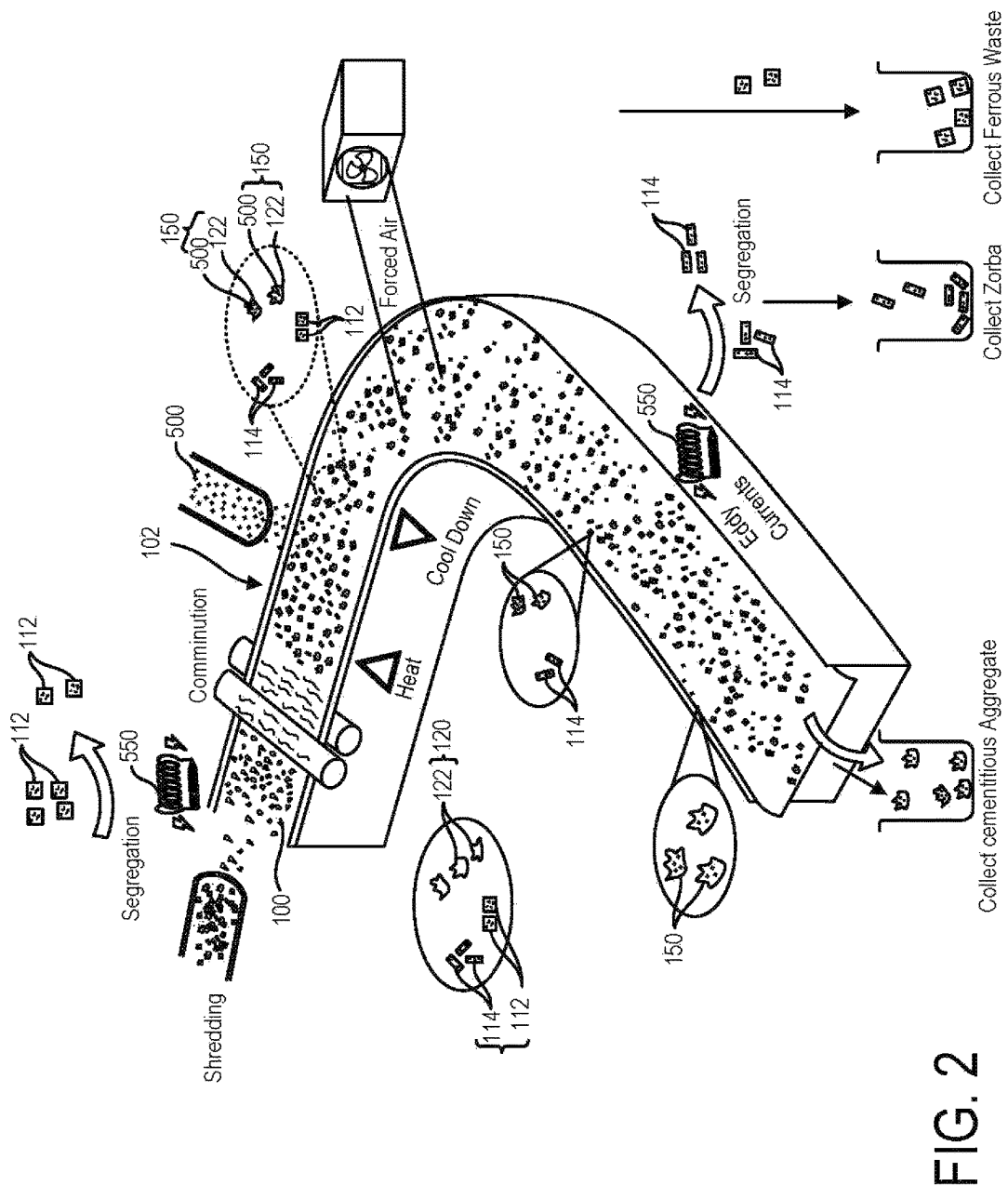
FIG. 2 is a process diagram of an example embodiment of the present method.

With reference now to the drawings, and in particular FIGS. 1 through 2 thereof, example of the instant method for post-consumer waste segregation, comminution, and creation of a cementitious aggregate employing the principles and concepts of the present method for post-consumer waste segregation, comminution, and creation of a cementitious aggregate and generally designated by the reference number 10 will be described.

Referring to FIGS. 1 through 2 a preferred embodiment of the present method for post-consumer waste segregation, comminution, and creation of a cementitious aggregate 10 is illustrated.

The present method for post-consumer waste segregation, comminution, and creation of a cementitious aggregate 10 has been devised to enable more efficient and complete separation of partially processed post-consumer waste 100 managed through a processing stream 102. Presently, complete segregation of comminuted zorba 114 from plastic waste 122 proves almost impossible, as plastic waste 122 tends to statically cling to the zorba 114 particles, whereby forcing separation of zorba 114 by application of eddy currents, as presently employed in the art, is generally less effective. A lowered reclamation rate of Beverage Can Aluminum, among other zorba 114, is therefore realized than is otherwise recoverable when the current method 10 is employed.

Addition of silica 500 into the processing stream 102, to effect binding of silica 500 to plastic waste 122 particles, increases the bulk density of said plastic waste 122 relative the bulk density of all non-plastic waste 124 comminuted in the processing stream 102 whereby application of eddy currents is rendered more effective to force zorba 114 away from the plastic waste 122. Recovery of almost 100% of zorba 114 is therefore enabled for reclamation and recycling, and the plastic waste 122 is thence collectable as a cementitious aggregate 150 usable as a load-bearing, lightweight substitute for traditional concrete aggregates used in construction.

The method for post-consumer waste segregation, comminution, and creation of a cementitious aggregate material 10, therefore, effects shredding of partially processed post-consumer waste 100 to a reduced size. Partially processed post-consumer waste 100, as discussed herein throughout, is taken to include non-metallic waste 120, non-plastic waste 124, metallic waste 110, and plastic waste 122. Non-metallic waste 120 comprises plastic waste 122 and other, non-metallic, non-plastic waste 124 (that is, non-metallic waste 120 includes all waste that is not metallic; non-plastic waste 124 comprises metallic waste 110 and other non-metallic waste 120 that does not include plastics (that is, non-plastic waste 124 includes all waste that does not include plastic); metallic waste 110 includes ferrous waste 112 and zorba 114 (that is, magnetic waste and non-magnetic metallic waste); plastic waste 122 includes all waste that is derived of hydrocarbon, organic, manufactured, plastic polymers such as, for example, polypropylene ("PP"), poly vinyl chloride ("PVC"), high density polyethylene ("HDPE"), low density polyethylene ("LDPE"), polyethylene terephthalate ("PET"), polystyrene ("PS"), among other recyclable plastics (s.a. "poly carbonate" and "ABS") found in post-consumer waste streams worldwide.

In the preferred embodiment herein disclosed, partially processed post-consumer waste 100 is taken to include approximately 97% plastic waste 122, and typically less than 1% ferrous waste 112 and approximately 2% and zorba 114. Zorba 114 is mainly derived from beverage can aluminum ("BCA").

Shredded post-consumer waste is then entered into a processing stream 102. Ferrous waste 112 is magnetically forced from the processing stream 102 by action of an electromagnet 550 caused to attract ferrous waste 112 away from the processing stream 102 as the processing stream 102 is made to pass close by said electromagnet 550. Ferrous waste 112 is thus segregated from the processing stream 102, and collected separate from remaining metallic and non-metallic waste 110, 120. Reclaimed ferrous waste 112 is thereby routable for recycling, as desired.

Subsequent removal of ferrous waste, the processing stream 102 is comminuted to a consistent, uniform bulk density and screened down to around $3/8^{th}$ of an inch. Silica 500 is then added to the processing stream 102 at heat to effect binding of the silica 500 to plastic waste 122 particles. Silica 500 mechanically bonds to plastic waste 122 particles to form an insulating cementitious aggregate 150. The bulk density of plastic waste 122 particles is thereby increased relative other, non-plastic waste 124 in the processing stream 102, by addition of silica 500 thereto, and any static cling between plastic waste 122 particles and other non-plastic waste 124 particles is obviated due to the insulating properties of the silica 500 bonded to the surface of said plastic waste 122 particles. Forced separation of remaining metallic waste 110 from the non-metallic waste 120 is now effected more completely, without plastic waste 122 particles clinging to ejected zorba 114, as is common absent silica 500 bonded to the plastic waste 122 particles.

Temperature applied to the processing stream 102 is preferably within the range of 120° C. to 480° C. and maintained for between 2 and 30 seconds. Heat may be applied to the silica 500 previous to addition of now heated silica 500 to the processing stream 102, whereby said heated silica 500 effects binding in contact with plastic waste 122 particles. Alternatively, heat may be applied to the processing stream 102 at the same range of temperature and duration of time, previous to addition of the silica 500, whereby the silica binds to the heated plastic waste 122 particles. Alternatively, silica 500 may be added to the processing stream 102, and then said processing stream 102 may be heated to a temperature within the stated range for a duration within the stated range of time.

Subsequent addition of silica 500 to the processing stream 102, and binding thereof to plastic waste 122 particles by action of applied heat, the processing stream is subjected to forced air to expedite cooling.

Once silica has been added to 500 the processing stream 102, and binding to plastic waste effects creation of a cementitious aggregate 150, the processing stream 102 is subjected to eddy currents devised to forcibly eject zorba 114 away from remaining non-metallic waste 120. Silica 500 bonded to the plastic waste 122 particles prevents static cling of the plastic waste 122 particles to zorba 114 during eddy current ejection. Eddy currents induced in a preferred embodiment of the present method 10 are effected at a range of 2.5 to 4 times the typical magnitude currently employed in ejecting zorba in the present state of the art, at a magnitude of around 12 poles. Zorba 114 and any remaining non-ferrous metallic waste 110 is thereby separable from the processing stream 102.

Remaining non-metallic waste 120 is subsequently collectable segregated from all recyclable metallic waste 110, said non-metallic waste 120 collected as a cementitious aggregate 150 wherein plastic waste 122 is usable in construction removed from the waste stream. Silica 500 bonded to plastic waste 122 particles enables mechanical bonding and increases cementation of the cementitious aggregate 150 wherein a lightweight, load-bearing alternative to traditional concrete aggregates is provided for use in construction.

What is claimed is:
1. A method for post-consumer waste segregation, comminution, and creation of a cementitious aggregate material comprising the steps of:
   shredding partially processed post-consumer waste to a reduced size said partially processed post-consumer waste comprising:
   non-metallic waste;
   plastic waste;
   to ferrous waste;
   zorba;
   entering said shredded waste into a processing stream;
   magnetically forcing ferrous waste from the processing stream;
   comminuting partially processed post-consumer waste to a reduced, standardized particulate size of consistent bulk density;
   adding silica to the processing stream and binding of the silica to plastic waste particles by action of heat effective to form an insulating cementitious aggregate, whereby bulk density of plastic waste particles is increased relative other, non-plastic waste in the processing stream and any static cling between plastic particles and other non-plastic waste particles is obviated;
   subjecting the processing stream to eddy currents devised to forcibly eject zorba away from remaining non-metallic waste;
   collecting non-metallic waste separated from recyclable metallic waste;
   directing zorba for reclamation of recyclable metals; and collecting the cementitious aggregate free of metallic waste;

wherein separation of plastic waste from ferrous waste and zorba is rendered effective to enable reclamation of ferrous and non-ferrous metals from the waste stream during creation of a cementitious aggregate segregable for use as a building material.

2. The method for post-consumer waste segregation, comminution, and creation of a cementitious aggregate materials of claim 1 wherein the heat is applied within a range of 120° to 480° C. while mixing the silica and waste together between 2 seconds and 30 seconds.

3. The method for post-consumer waste segregation, comminution, and creation of a cementitious aggregate materials of claim 2 wherein the plastic waste is deflected from other non-metallic waste by action of forced air tangentially applied to the processing stream.

* * * * *